July 20, 1943.  W. ANGST  2,324,666

ADJUSTABLE LINKAGE FOR PRESSURE MEASURING INSTRUMENTS

Filed Oct. 3, 1940  2 Sheets-Sheet 1

INVENTOR
WALTER ANGST
BY Gunter Rathke
his ATTORNEY

July 20, 1943.   W. ANGST   2,324,666
ADJUSTABLE LINKAGE FOR PRESSURE MEASURING INSTRUMENTS
Filed Oct. 3, 1940   2 Sheets-Sheet 2

INVENTOR
WALTER ANGST
BY
his ATTORNEY

Patented July 20, 1943

2,324,666

UNITED STATES PATENT OFFICE 2,324,666

ADJUSTABLE LINKAGE FOR PRESSURE MEASURING INSTRUMENTS

Walter Angst, Manhasset, N. Y., assignor to Square D Company, Detroit, Mich., a corporation of Michigan Application October 3, 1940, Serial No. 359,555

5 Claims. (Cl. 73—4)

This invention relates to improvements in measuring instruments in which a movable member, such as a pointer, is moved by a change-in-condition-responsive element such as, for example, a diaphragm, at a greatly increased rate.

It is an object of this invention to provide in a measuring instrument means for facilitating calibration of the instrument to a predetermined range.

An object of this invention will be readily understood from the following specific example:

It may be assumed that a sensitive altimeter of a range of 35,000 feet is to be calibrated for accurate reading at zero and 35,000 feet altitude. It may be further assumed that the altitude sensitive element in the altimeter be a set of diaphragm capsules which move a sensitive pointer through 35 revolutions for the entire range relatively to a dial.

It is common practice in the instrument field to use prefabricated dials and during assembly to calibrate the instrument mechanism to match the dial.

It may be assumed that the sensitive altimeter above referred to is to be equipped with a prefabricated dial having a 1,000 foot scale spread out over an arc of 360°.

In order to obtain correct readings, it is now necessary to adjust the ratio of amplification of the actuating mechanism in such manner that the pointer after initial setting to zero makes 35 entire revolutions to read 35,000 feet at a pressure equivalent to 35,000 feet altitude.

In order to permit adjustment of the ratio of amplification of the transmission mechanism there is usually provided in the mechanism a shaft, generally called "rock shaft," having at least one calibrating arm attached to it the length of which may be varied by clamping the arm to the rock shaft at a longer or shorter distance from its end.

If after an initial zero adjustment it is found that the instrument over- or under-reads at a pressure condition equivalent to 35,000 feet altitude it is necessary to decrease or increase the ratio of amplification of the mechanism by adjusting the length of the calibrating arm.

This is generally done by loosening the clamping connection between the arm at the rock shaft and clamping it in a new position. This method of adjusting is extremely time consuming and rather a hit or miss method since the adjustment is very sensitive.

In a certain type of altimeter, for example, which is in common use throughout the world, a change in the length of the calibrating arm of one thousandth of an inch causes a change in the indication of approximately 70 feet at 35,000 feet altitude. Assuming that a test at a pressure corresponding to 35,000 feet shows an over-reading of the instrument of 50 feet, it follows that an adjustment by less than one thousandth of an inch is required to correct the instrument. Such adjustment is extremely difficult to make with the conventional mechanism.

It is, accordingly, a purpose of this invention to provide in a sensitive measuring or indicating instrument mechanism permitting minute adjustment of the ratio of amplification.

It is a further object of the invention to provide in an instrument of the character referred to calibrating means of simple construction permitting accurate calibration of the instrument in a fraction of the time heretofore required with conventional adjusting means, thereby considerably reducing manufacturing cost.

Further aims, objects and advantages will appear from a consideration of the description which follows with accompanying drawings showing for purely illustrative purposes embodiments of this invention. It is to be understood, however, that the description is not to be taken in a limiting sense, the scope of the invention being defined in the appended claims.

Referring to the drawings.

Figure 1:
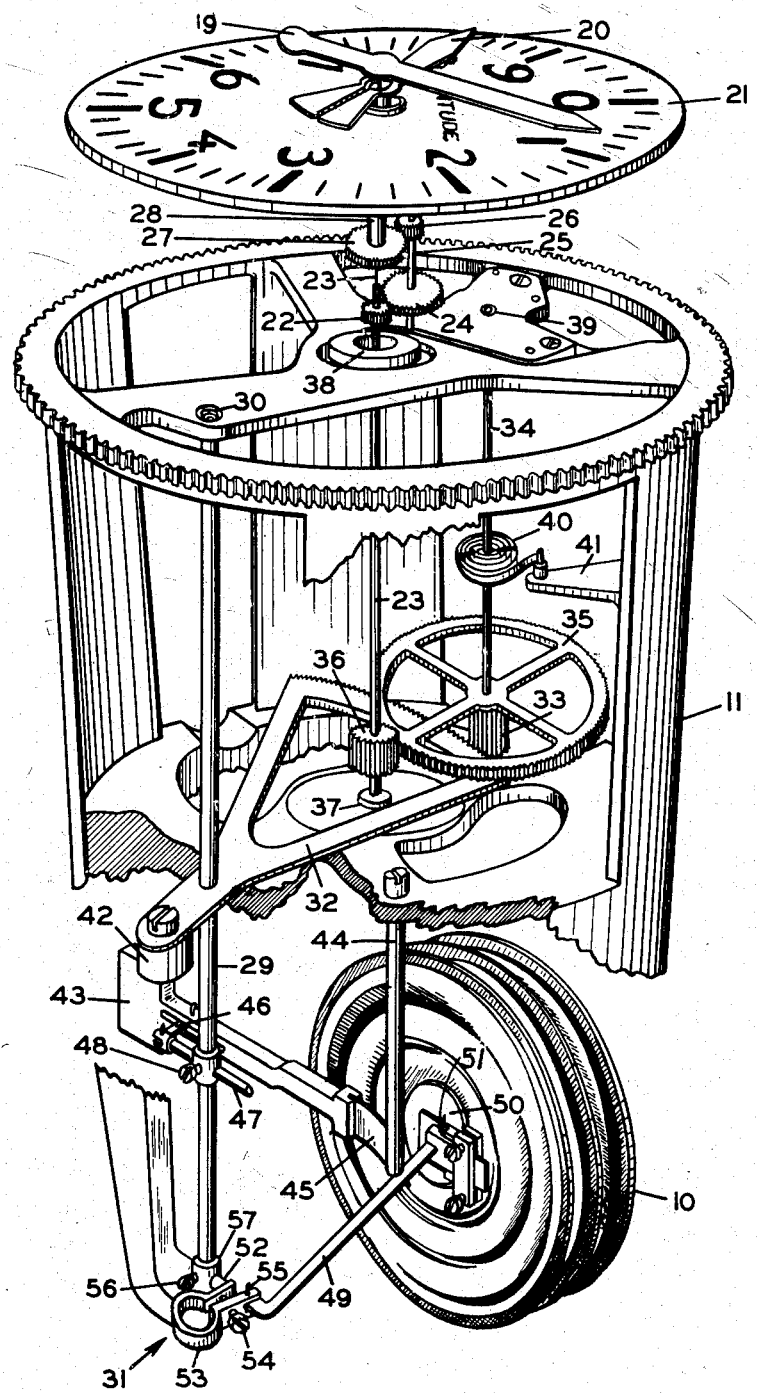
Fig. 1 is a perspective exploded view of an altimeter embodying the present invention. In this figure some parts are broken away and others omitted to show the mechanism more clearly.
Figure 2:
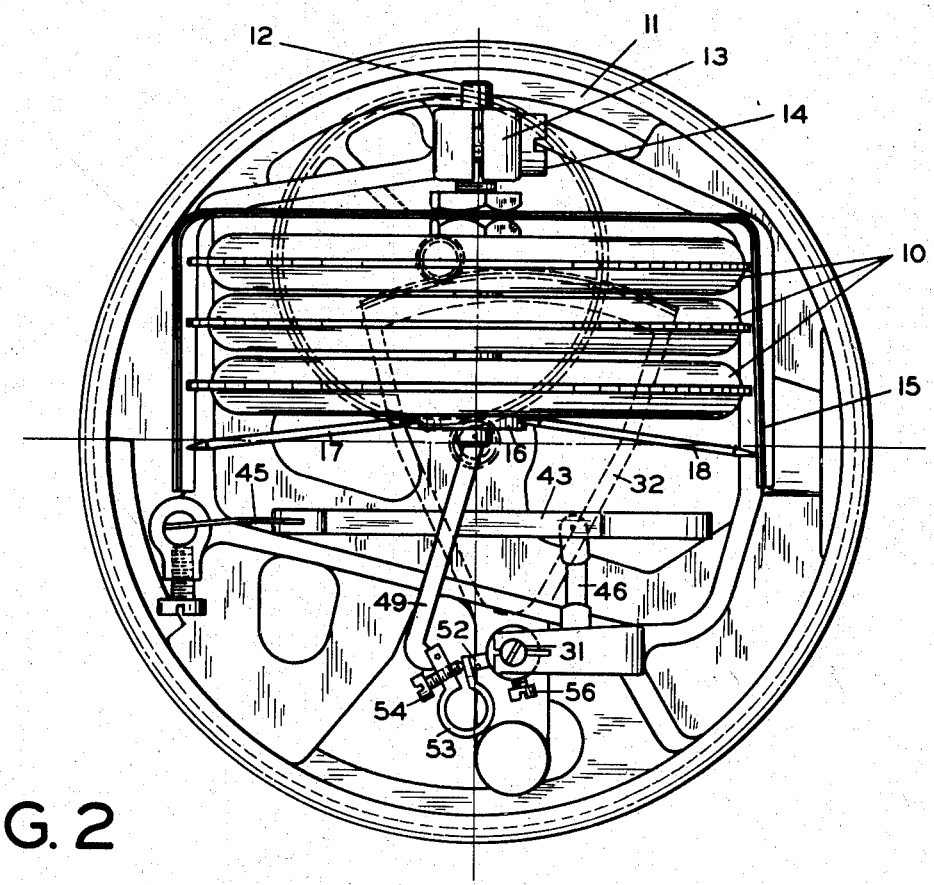
Fig. 2 is an end view of the device shown in Fig. 1.

In the drawings the invention is illustrated as applied to an altimeter mechanism. It is to be understood, however, that the invention is not limited to the illustrated example but has general application to any motion amplifying mechanism of measuring instruments.

In the illustrated embodiment, an actuating element, in the form of a set of three diaphragms 10, is mounted to a supporting frame 11 by means of a mounting post 12 clamped in an extension 13 of the frame 11 by means of a screw 14. The set of diaphragms may or may not be equipped with a temperature compensator shown in the illustrated embodiment as being a U-shaped temperature responsive spring 15 acting on the movable centerpiece 16 of the diaphragms by means of toggle levers 17 and 18. In Fig. 1 the temperature compensating device is omitted for the sake of clearness.

The actuating element is connected to indicating means by means of a motion amplifying mechanism.

In the illustrated embodiment, the indicating means comprises two pointers 19 and 20 movable relatively to a dial 21. In Fig. 1 the dial is shown to be graduated in feet, each major division of the dial, marked by numerals, representing 100 feet altitude if read against the large pointer 19 or 1,000 feet if read against the small pointer 20. The pointers of the illustrated instrument move in the ratio of ten to one, and are for such movement interconnected by a gear train including a pinion 22 on the shaft 23 of the large pointer 19. The pinion 22 meshes with the gear 24 and drives by means of a shaft 25 a second pinion 26 meshing with the larger gear 27 on the hollow shaft 28 of the small pointer 20. The shaft 23 is moved in response to movement of the diaphragm capsules at a greatly increased rate.

The actuating mechanism of the illustrated embodiment further includes a rock shaft 29 mounted in bearings 30 and 31. The rock shaft may carry any suitable mechanism for moving the pointer shaft 23.

In the illustrated embodiment there is shown a toothed sector 32 meshing with a pinion 33 on a shaft 34. The pinion 33 drives a gear 35 meshing with a further pinion 36 on the pointer shaft 23. The bearings of the pointer shaft 23 are visible at 37 and 38.

Shaft 34, one bearing of which is visible at 39, may be acted upon by a hair spring 40 for eliminating back-lash in the mechanism. The spring 40 is connected with its inner end to the shaft 34, the outer end being connected to an arm 41 on the frame 11.

Means may be provided for balancing the mechanism to make it non-responsive to acceleration forces. In the illustrated embodiment there is shown a counterbalancing weight 42 on the gear sector 32 and a counterbalancing weighted lever 43 mounted to a stem 44 on the frame 11 in any convenient manner such as, for example, by a flat spring 45. The counter-balancing lever acts on the shaft by means of a link connection, there being shown a link 46 connected to an arm 47 clamped to the rock shaft by means of a screw 48. The influence of the counter-balancing weight is thus made adjustable by varying the length of the adjusting arm 47 at the clamping screw 48.

An operative connection is provided between the actuating element and the motion amplifying mechanism. In the illustrated embodiment there is shown a link connection between the diaphragms 10 and the rock shaft 29. The link connection includes a link 49 pivoted to a centerpiece assembly 50 of the diaphragms at 51, the link 49 being connected to an adjustable member permitting of minute changes in calibration of the mechanism.

Since all the elements so far disclosed, including the dial, are prefabricated, it is necessary to match the ratio of amplification of the mechanism with the dial graduation. More particularly, it is necessary that after an initial setting of the pointers to zero, the pointers give an accurate indication at the end of the range for which the instrument is intended.

The illustrated instrument has an operating range of 35,000 feet. It is, accordingly, necessary to adjust the ratio of amplification of the mechanism so that at a pressure corresponding to 35,000 feet altitude, the large pointer 19 registered with the zero mark on the dial. The ratio of amplification of the amplifying mechanism is such that a change of adjustment of only one thousandth of an inch in the length of the lever arm at which the link 49 acts on the rock shaft will cause a change in the indication of 70 feet. To correct an error of 50 feet, for example, it is thus necessary to make a minute adjustment of less than one thousandth of an inch to correct for such over- or under-reading at the end of the range of the instrument.

This is accomplished by means of an adjusting member having a resilient portion which may be expanded or contracted by means of a calibrating screw.

In the form of the invention shown in Fig. 1 there is shown a member having a straight substantially cylindrical portion 52 and a resilient substantially U-shaped portion 53. One leg of the U is connected to the cylindrical portion 52. The free leg is movable relatively thereto by means of an adjusting screw 54 and is connectible to the link 49 at 55. The adjusting member thus permits primary adjustment by clamping the cylindrical member 52 at variable distances to the rock shaft by means of a clamping screw 56 threaded in a sleeve 57.

After a primary adjustment has been made minute secondary adjustments may easily be made by means of the calibrating screw 54 thereby eliminating such hit and miss adjustment as may be effected, for example, by clamping the adjusting member to the rock shaft at various lengths from the pivot point 55.

Figures 3, 4:
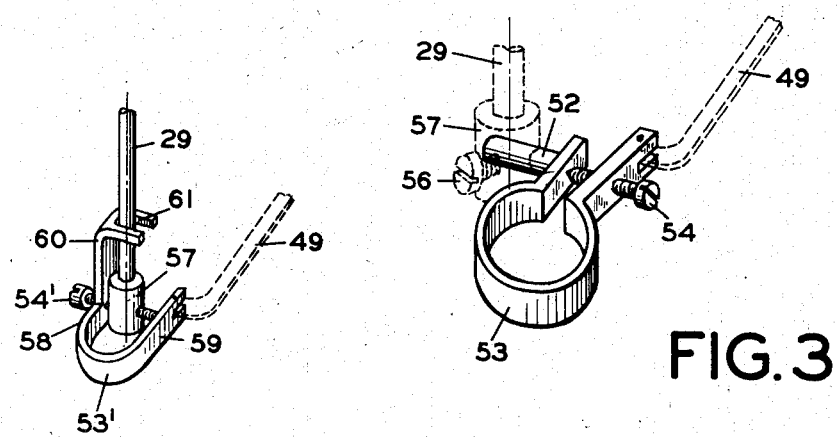
Fig. 3 is a perspective view of an element shown in the device of Figs. 1 and 2.
Fig. 4 is a modified form of the element shown in Fig. 3.

The calibrating member which is shown on a larger scale in Fig. 3 is susceptible of being manufactured in various forms, a modified form being shown in Fig. 4. The modified form comprises a resilient U-shaped member 53' having a first leg 58 and a second leg 59 movable relatively to the first leg by means of a calibrating screw 54'. The calibrating member straddles the sleeve 57 of the rock shaft with its U-shaped portion. The first leg 58 may be provided with an extension 60, the end of which is forked and bent at right angles at 61 to straddle the rock shaft thereby preventing turning of the member with a calibrating screw 54'.

Obviously the present invention is not restricted to the particular forms and embodiments herein shown and described. Moreover the invention is useful in connection with other forms of measuring or indicating instruments than the one hereinbefore described for purposes of explanation and illustration.

What is claimed is:

1. In an indicating instrument of the character described the combination of a rock shaft having a bore therethrough transverse to the axis of the shaft; a calibrating arm having a straight and a resilient substantially U-shaped portion, the said arm being insertable with its straight portion into said bore; a first screw for fixing said arm in said bore for primary adjustment; and a second screw for expanding and contracting said resilient portion for secondary adjustment.

2. In an indicating instrument of the character described the combination of a rock shaft having a bore therethrough transverse to the axis of the shaft; a calibrating member having a resilient substantially U-shaped portion straddling the rock shaft at said bore, an adjusting screw passing through one leg of said U and through said bore for expanding and contracting said U-shaped portion and holding said member in place, the other leg being adapted for connection of an actuating element thereto.

3. In an indicating instrument of the character described the combination of a rock shaft having a bore therethrough transverse to the axis of the shaft; a calibrating member having a resilient substantially U-shaped portion straddling the rock shaft at said bore, an adjusting screw passing through one leg of said U and through said bore for expanding and contracting said U-shaped portion, said one leg being provided with an extension parallel to the rock shaft, the end of the extension being forked and bent at right angles to straddle said rock shaft, thereby preventing turning of said member with said screw, the other leg of said U having provision for connecting of an actuating element thereto.

4. In a pressure responsive device of the character described having a pressure responsive diaphragm, a rockshaft, and means operatively connected to said rockshaft for moving an indicator; mechanism for connecting said rockshaft and diaphragm which comprises a substantially U-shaped member providing an adjustably mounted lever and having one leg thereof connected to said rockshaft, said member having in one leg thereof an opening to receive an adjusting screw, an adjusting screw extending through said opening with its end contacting the opposite leg of said member and adapted upon being turned to spread or contract said legs for lengthening and shortening the effective lever length of said U-shaped member, means providing primary adjustment of said first mentioned leg of said U-shaped member to said rockshaft, a bifurcation at the end of the leg of said U-shaped member remote from said rockshaft to provide a pivot connection and a link pivotally connected at one end to said last mentioned leg and having its opposite end connected to said diaphragm, said adjusting screw providing secondary minute adjustment for the effective lever length of said U-shaped member to facilitate calibration of said device.

5. An adjustable lever attachment for a rock shaft which comprises a sleeve adapted to be attached to said shaft, a member having a resilient substantially U-shaped portion forming two legs, a short straight member having one of its ends connected to said sleeve and its other end connected to the end of one of said legs, the other leg being provided with a forked end for connection to a link, a set screw in said sleeve to maintain said short straight member in adjusted position with respect to said sleeve, a screw passing through one of said legs and engaging the other of said legs for expanding and contracting said U-shaped portion, thereby lengthening and shortening the effective lever length from the rock shaft to the point of connection of a link with said forked end.

WALTER ANGST.